United States Patent
Fu et al.

(10) Patent No.: US 10,429,920 B2
(45) Date of Patent: Oct. 1, 2019

(54) DISPLAY APPARATUS AND DRIVING METHOD THEREFOR

(71) Applicant: AU OPTRONICS CORPORATION, Hsin-chu (TW)

(72) Inventors: Jhih-Syuan Fu, Hsin-chu (TW); Chun-Fan Chung, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 20 days.

(21) Appl. No.: 15/813,612

(22) Filed: Nov. 15, 2017

(65) Prior Publication Data

US 2018/0335826 A1 Nov. 22, 2018

(30) Foreign Application Priority Data

May 19, 2017 (TW) .............................. 106116750 A

(51) Int. Cl.
*G09G 3/34* (2006.01)
*G06F 1/3234* (2019.01)

(52) U.S. Cl.
CPC ......... *G06F 1/3265* (2013.01); *G09G 3/3406* (2013.01); *G09G 2330/021* (2013.01); *G09G 2360/08* (2013.01)

(58) Field of Classification Search
None
See application file for complete search history.

(56) References Cited

U.S. PATENT DOCUMENTS

| 6,756,956 B2 * | 6/2004 | Kudo ................. G09G 3/3648 345/89 |
| 8,154,503 B2 * | 4/2012 | Chung ................ G09G 3/3688 345/100 |
| 9,070,342 B2 * | 6/2015 | Wu .................... G09G 3/3688 |

(Continued)

FOREIGN PATENT DOCUMENTS

| CN | 102024399 A | 4/2011 |
| TW | 591585 B | 6/2004 |
| TW | 201044362 A1 | 12/2010 |

OTHER PUBLICATIONS

Office Action issued by (TIPO) Intellectual Property Office, Ministry of Economic Affairs, R.O.C. dated Sep. 28, 2018 for Application No. 106116750, Taiwan.

*Primary Examiner* — Chad M Dicke
(74) *Attorney, Agent, or Firm* — Tim Tingkang Xia, Esq.; Locke Lord LLP

(57) ABSTRACT

A driving method includes: allocating multiple pieces of channel data to multiple first channel groups and multiple second channel groups; determining, based on the multiple pieces of channel data, a largest gray scale value difference of two adjacent pieces of channel data of each of the first channel groups, to determine multiple drive currents; or determining, based on a first piece of data and a second piece of data that correspond to each of the multiple second channel groups in the multiple pieces of channel data, a first transient value and a second transient value that correspond to each of the multiple second channel groups, where the multiple drive currents are used to drive the first channel groups; and determining, based on the first transient value and the second transient value, whether at least one of the second channel groups performs a power saving operation.

17 Claims, 8 Drawing Sheets

(56) References Cited

U.S. PATENT DOCUMENTS

| | | |
|---|---|---|
| 9,449,557 B2 | 9/2016 | Kim |
| 2006/0262069 A1 | 11/2006 | Do et al. |
| 2010/0309192 A1 | 12/2010 | Chao et al. |
| 2013/0169671 A1 | 7/2013 | Iwahara et al. |
| 2014/0104243 A1 | 4/2014 | Sakariya et al. |
| 2016/0372064 A1* | 12/2016 | Chen .................... G09G 3/3648 |
| 2017/0278470 A1* | 9/2017 | Su ........................... G09G 3/20 |

* cited by examiner

| | Group 11 | | Group 12 | | | Group 13 | | | ...... | Group 1M | |
|---|---|---|---|---|---|---|---|---|---|---|---|
| L11 | 0 | 0 | 0 | 0 | 200 | 180 | 255 | 80 | ...... | 50 | 0 | 0 |
| L12 | 0 | 0 | 0 | 0 | 135 | 100 | 120 | 200 | ...... | 0 | 0 | 0 |
| L11-12 | 0 | 0 | 0 | 0 | 65 | 80 | 135 | -120 | ...... | 50 | 0 | 0 |

FIG. 3

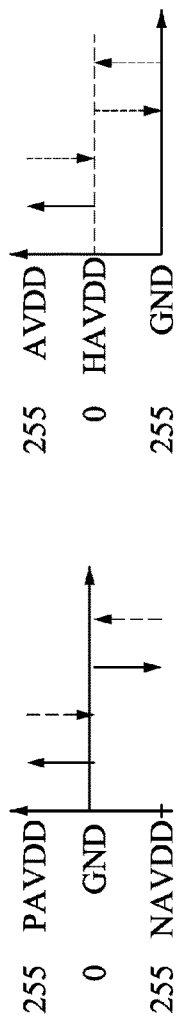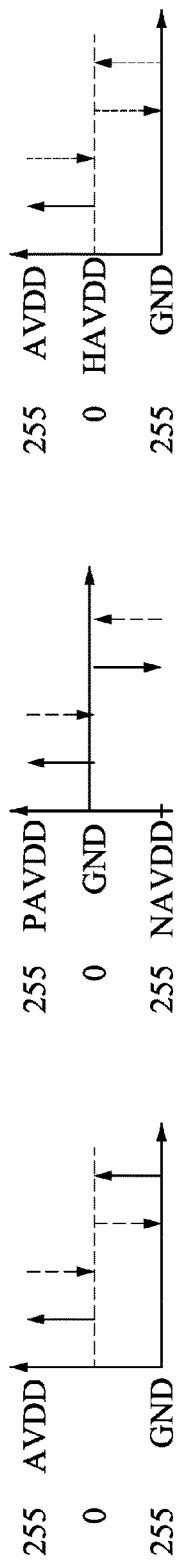
FIG. 5A   FIG. 5B   FIG. 5C
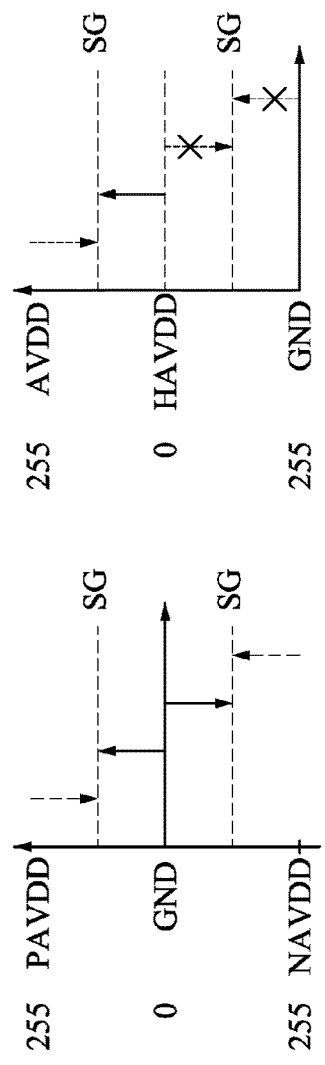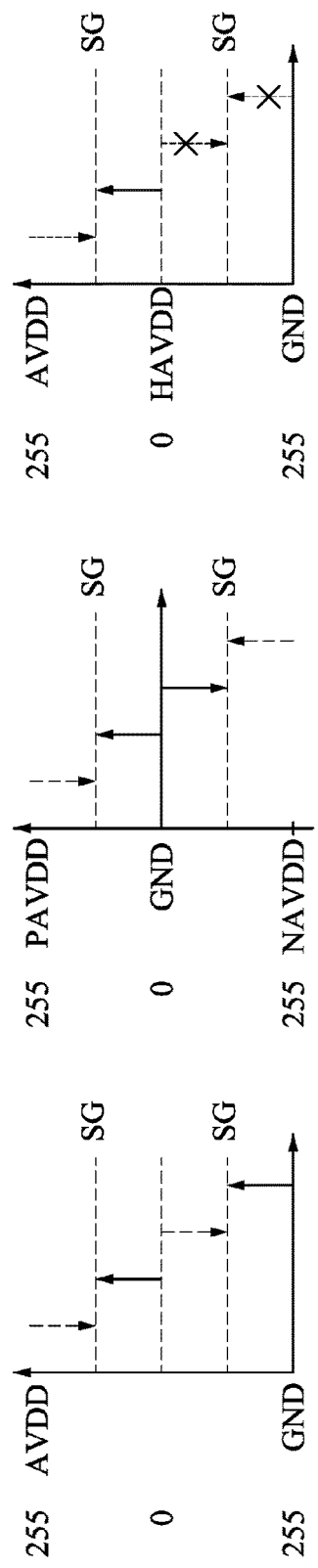
FIG. 6A   FIG. 6B   FIG. 6C

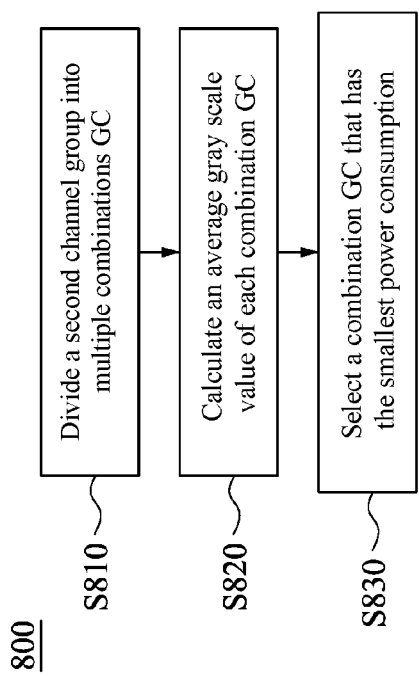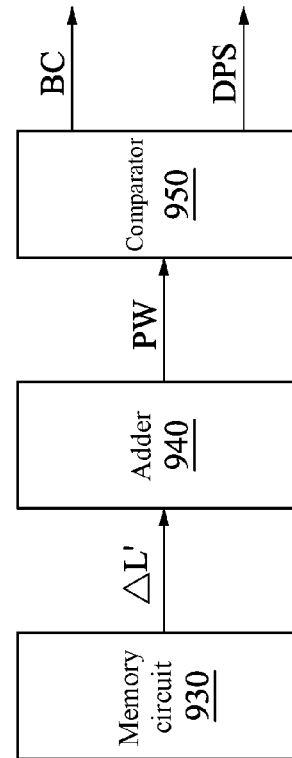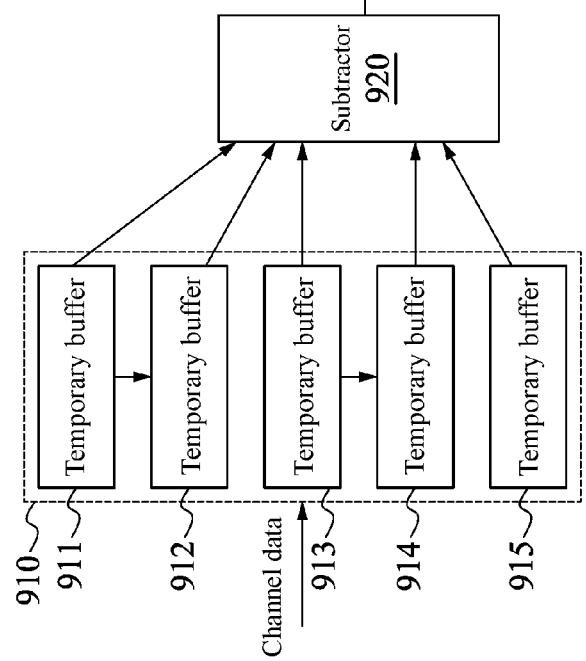

DISPLAY APPARATUS AND DRIVING METHOD THEREFOR

CROSS-REFERENCE TO RELATED PATENT APPLICATION

This application claims priority to and the benefit of, pursuant to 35 U.S.C. § 119(a), patent application Serial No. 106116750 filed in Taiwan on May 19, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a driving method, and in particular, to a driving method for a power saving mechanism in a display panel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With rapid development of display apparatuses, people use various display apparatuses such as mobile phones or computers anytime anywhere. During usage of a display apparatus, each time when a screen of the display apparatus changes, a different power consumption is caused, and the power consumption directly affects people's concern about using the display apparatus.

However, as people are paying more attention on the problem of power saving and energy saving, a power saving operation of the existing display apparatus can hardly perform a simple and accurate power consumption estimation. As a result, the power saving operation of the display apparatus is still restricted by an algorithm with a large amount of calculation.

Therefore, to reduce a power consumption of a display apparatus more accurately by using an algorithm with a small amount of calculation, a power saving operation of the display apparatus becomes a major subject of designing the display apparatus.

SUMMARY

According to one aspect of the present disclosure, a driving method is provided. The driving method includes: allocating multiple pieces of channel data to multiple first channel groups and multiple second channel groups; determining, based on the multiple pieces of channel data, a largest gray scale value difference of two adjacent pieces of channel data of each of the plurality of first channel groups, to determine multiple drive currents; or determining, based on a first piece of data and a second piece of data that correspond to each of the multiple second channel groups in the multiple pieces of channel data, a first transient value and a second transient value that correspond to each of the multiple second channel groups; and determining, based on the first transient value and the second transient value, whether at least one of the plurality of second channel groups performs a power saving operation.

According to another aspect of the present disclosure, a display apparatus is provided, including a control unit and a driver. The control unit is configured to allocate multiple pieces of channel data to multiple first channel groups and multiple second channel groups. The control unit is further configured to: determine, based on the multiple pieces of channel data, a largest gray scale value difference of two adjacent pieces of channel data of each of the multiple first channel groups, to determine multiple drive currents; or determine, based on a first piece of data and a second piece of data that correspond to each of the multiple second channel groups in the multiple pieces of channel data, a first transient value and a second transient value that correspond to each of the multiple second channel groups. The multiple drive currents are used to drive the multiple first channel groups. The control unit is further configured to generate a power saving operation signal based on the first transient value and the second transient value, to determine whether at least one of the multiple second channel groups performs a power saving operation. The driver is configured to output the multiple drive currents or drive, based on the power saving operation signal, the at least one of the second channel groups to perform the power saving operation.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 3 is a schematic diagram of a first channel group according to an embodiment of the present disclosure;

FIG. 5A is a schematic diagram of determination of which transient consumes power when a voltage mode is full positive voltage according to an embodiment of the present disclosure;

FIG. 5B is a schematic diagram of determination of which transient consumes power when a voltage mode is positive/negative voltage according to an embodiment of the present disclosure;

FIG. 5C is a schematic diagram of determination of which transient consumes power when a voltage mode is half voltage according to an embodiment of the present disclosure;

FIG. 6A is a schematic diagram of a charge storage status of an external capacitor when a voltage mode is full positive voltage according to an embodiment of the present disclosure;

FIG. 6B is a schematic diagram of a charge storage status of an external capacitor when a voltage mode is positive/negative voltage according to an embodiment of the present disclosure;

FIG. 6C is a schematic diagram of a charge storage status of an external capacitor when a voltage mode is half voltage according to an embodiment of the present disclosure;

FIG. 8 is a flowchart of a part of the operation method in FIG. 2 according to another embodiment of the present disclosure; and FIG. 9 is a block diagram of a circuit of the control unit in FIG. 1 according to an embodiment of the present disclosure.

DETAILED DESCRIPTION

Figure 1:
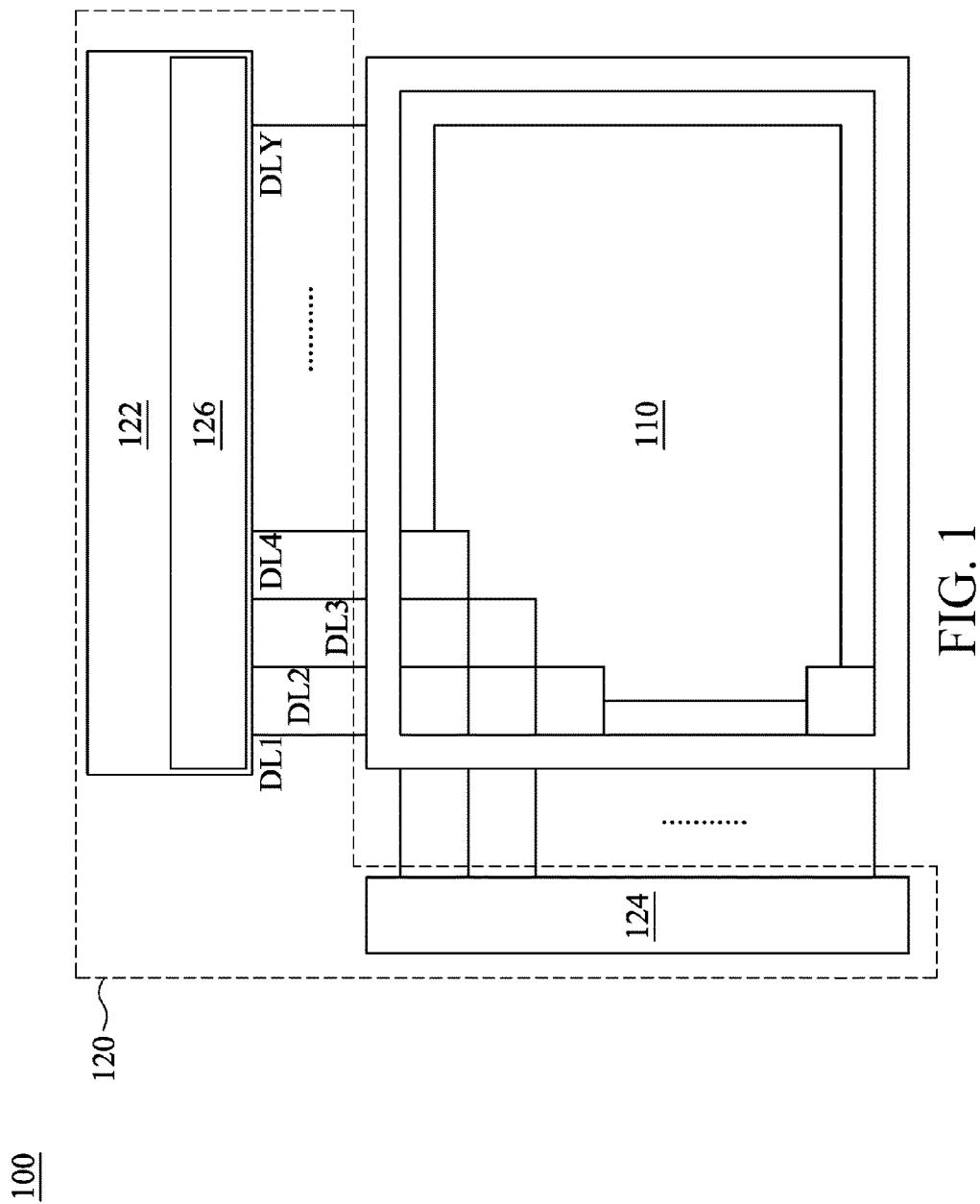
FIG. 1 is a schematic diagram of a display apparatus according to an embodiment of the present disclosure.

Embodiments accompanied with figures are described in detail below. However, the embodiments provided are not intended to limit the scope of the present disclosure. The description of structures and operations are not intended to limit the order of execution. Any structure formed by recombining elements shall fall within the scope of the present disclosure as long as an equivalent apparatus can be generated. In addition, the figures are merely provided for the purpose of description, but are not drawn to scale. Same or similar elements are denoted by same reference numerals in the following description to facilitate understanding.

The terms "first", "second" and the like as used herein are used merely for distinguishing between elements or operations described by using same technical terms, and are not necessarily for describing a sequence or ranking or for limiting the present invention.

As used herein, either "coupled" or "connected" may mean that two or more elements are either in direct physical or electrical contact, or that two or more elements are not in direct contact with each other, or "coupled" or "connected" may mean that two or more elements interoperate or interact with each other.

Referring to FIG. 1, FIG. 1 is a schematic diagram of a display apparatus 100 according to an embodiment of the present disclosure. The display apparatus 100 includes a display panel 110 and a driving circuit 120. The driving circuit 120 further includes a source driver 122, a gate driver 124, and a control unit 126. In this embodiment, the control unit 126 is disposed inside the source driver 122, but is not limited thereto. Alternatively, the control unit 126 may be disposed outside the source driver 122, or disposed inside the display panel 110 (not shown). In some embodiments, the source driver 122 may be replaced with a hybrid integrated circuit (IC), which includes a source driver circuit, a timing controller (TCON), or another related driving circuit. In some embodiments, the integrated IC is a TCON embedded driver (TED).

In some embodiments, the control unit 126 receives a timing signal output by the TCON (not shown), and outputs a bias voltage control signal and a power saving control signal according to the timing signal and the plurality channel data, to determine whether to start a power saving operation.

Figure 2:
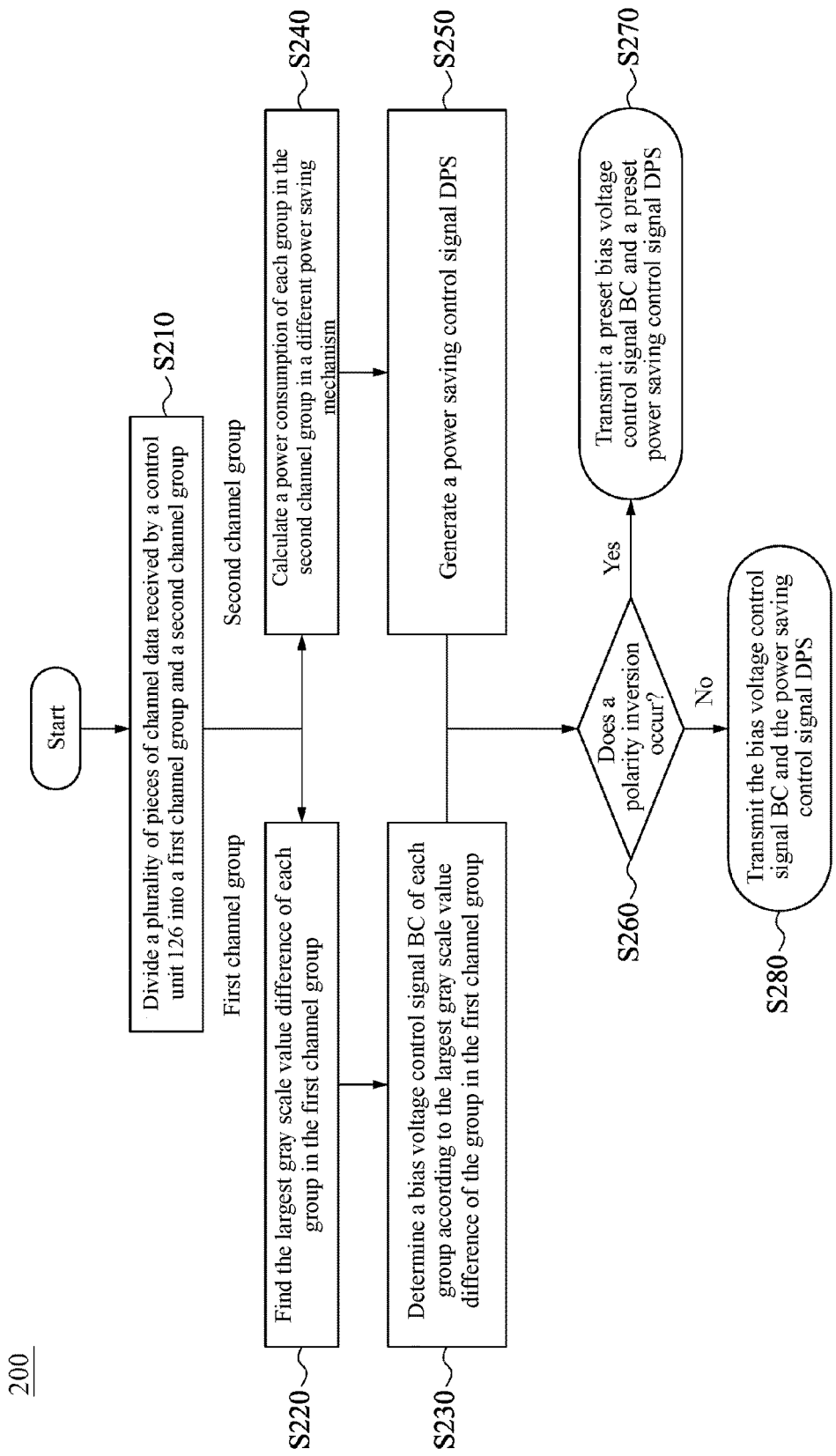
FIG. 2 is a flowchart of an operation method of a control unit in FIG. 1 according to an embodiment of the present disclosure.

Referring to FIG. 2, FIG. 2 is a flowchart of a driving method 200 in conjunction with an operation of the control unit 126 in FIG. 1 according to an embodiment of the present disclosure. It should be noted that, the driving method 200 is not limited to being applied to the display apparatus 100 in FIG. 1 or implemented in combination with the control unit 126 in FIG. 1. For convenience and clear description, the driving method 200 is described below by using FIG. 1 as an example.

As shown in FIG. 2, step S210 is first performed, to divide the channel data received by the control unit 126 into a first channel group and a second channel group. In an embodiment, when the received channel data corresponds to light-load channel data (for example, black or white), the channel data is allocated to the first channel group, for a subsequent operation, such as a static adjustment operation. The first channel group includes M groups (Group 11, Group 12, . . . , and Group 1M shown in FIG. 3), and each group in the M groups corresponds to three adjacent channels in one row.

On the other hand, in an embodiment, when the received channel data corresponds to heavy-load, colored image, or stripe-shaped channel data, the channel data is allocated to the second channel group, for a subsequent operation, such as a dynamic adjustment operation. Then the second channel group is divided into N groups according to a driving waveform. The grouping rule described above is merely an example, and is not limited thereto. Grouping rules of different methods all fall within the protection scope of the present disclosure.

Subsequently, step S220 is performed, to find the largest gray scale value difference of each group in the first channel group. Referring to FIG. 3, FIG. 3 is a schematic diagram of multiple groups of channel data in a first channel group according to an embodiment of the present disclosure. As shown in FIG. 3, L11 represents channel data (or referred to as gray scale values) corresponding to multiple pixels in one row, and L12 represents channel data (or referred to as gray scale values) corresponding to multiple pixels in one row adjacent to L11. Every three adjacent pieces of channel data (for example, channel data corresponding to three adjacent columns) in L11 or L12 are grouped into one group. In this way, L11 and L12 each include M groups, that is, Group 11, Group 12, . . . , and Group 1M shown in FIG. 3. In some embodiments, a data value of channel data may also be referred to as a gray scale value. For ease of understanding, the following embodiments of the present disclosure are described by using the gray scale value as an example, but the present disclosure is not limited thereto.

In step S220, the largest gray scale value difference is obtained as follows: The gray scale values in L12 are subtracted from the gray scale values in L11 to obtain corresponding gray scale value differences, that is, the gray scale values represented by (L11-L12) shown in FIG. 3, and then the largest one selected from the gray scale value differences in each group is the largest gray scale value difference of the group. For example, in Group 12, the largest gray scale value difference is 65. Therefore, 65 is the largest gray scale value difference in the group. In this embodiment, the three gray scale values included in each group in the first channel group are only an example, and are not intended to limit the present invention. A person of ordinary skill in the art can deduce by analogy that each group in the first channel group may include different numbers of gray scale values.

Subsequently, step S230 is performed, to determine a bias voltage control signal BC of each group according to the largest gray scale value difference of each group in the first channel group and multiple first critical values. In an embodiment, the bias voltage control signal may be divided into four types: $BC_1$, $BC_2$, $BC_3$, and $BC_4$, and the source driver 122 outputs bias currents with different values according to the received bias voltage control signals. In an embodiment, the first critical values may be set, corresponding to the gray scale differences, to 0, 1, 127, and 255, and currents corresponding to the critical values are respectively $I_4$, $I_3$, $I_2$, and $I_1$, where $I_4<I_3<I_2<I_1$. For example, when a gray scale difference shown in FIG. 3 is 0, an output corresponding current is $I_4$. When a gray scale difference is 1, an output bias current is $I_3$. When a gray scale difference is any one of 2 to 127, an output bias current is $I_2$. When a gray scale difference is any one of 128 to 255, an output bias current is $I_1$. However, the gray scale differences according to which values of the bias currents are determined are only examples, and are not intended to limit the present invention. A person of ordinary skill in the art may deduce by analogy multiple levels of gray scale differences and different ranges of gray scale differences.

Using Group 12 in FIG. 3 as an example, the three gray scale value differences in Group 12 are 0, 0, and 65, and the greatest gray scale value difference is 65 according to step S220. Subsequently, according to step S230, the gray scale value difference 65 is between 2 and 127. Therefore, the control unit 126 outputs a bias voltage control signal $BC_2$, and the source driver 122 outputs a bias current $I_2$ according to the bias voltage control signal $BC_2$.

On the other hand, step S240 is: calculate a power consumption of each group in the second channel group in a different power saving mechanism, where step S240 and step S220 may be performed at the same time or performed separately. For clear description, the implementation of step S240 is described by using the following FIG. 4A to FIG. 7 as an example, but is not limited thereto.

Figure 4A:
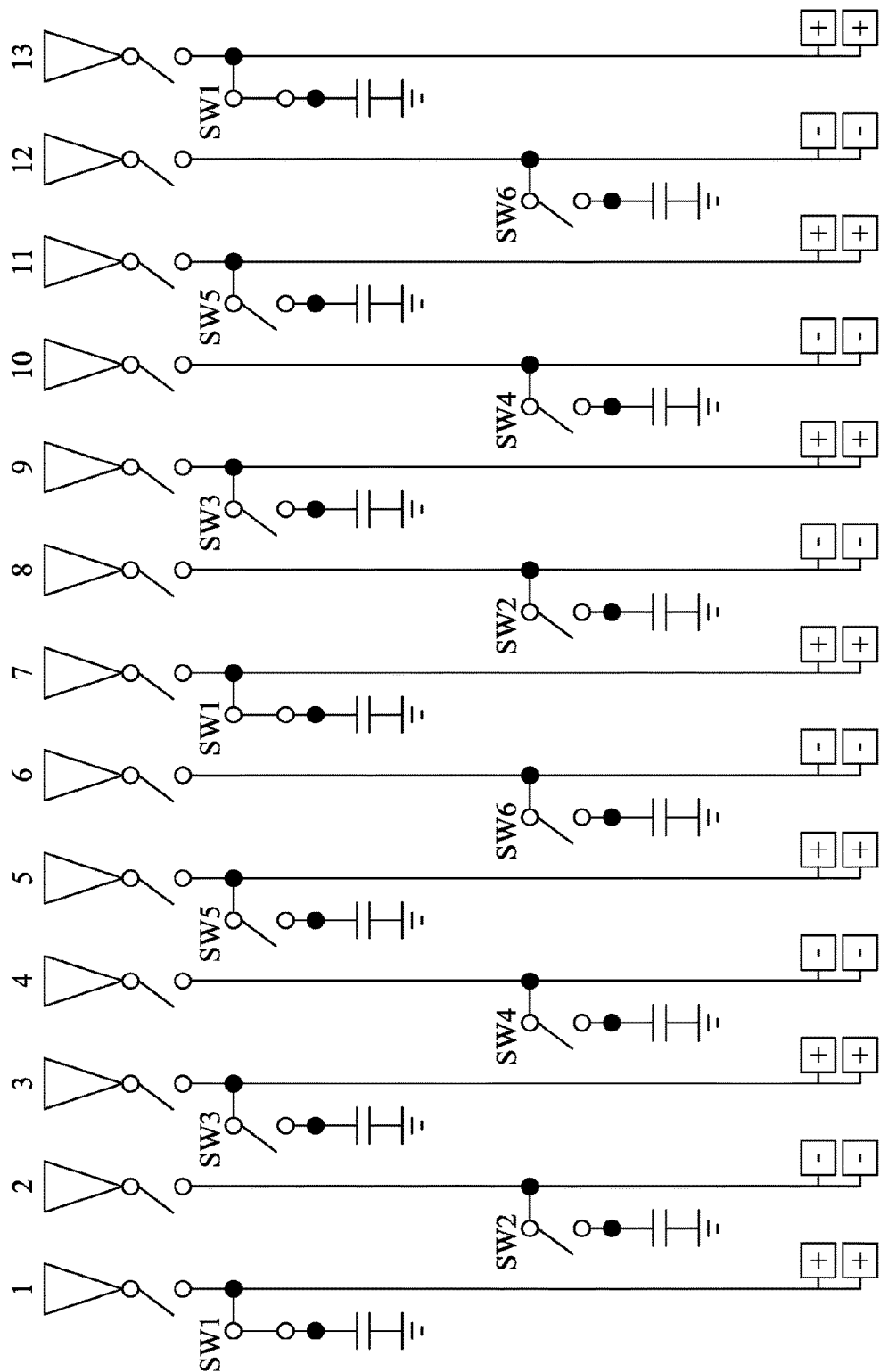
FIG. 4A is a schematic diagram of a partial circuit of the display apparatus shown in FIG. 1 according to an embodiment of the present disclosure.

Referring to FIG. 4A, FIG. 4A is a schematic diagram of a partial circuit of the display apparatus 100 shown in FIG. 1 according to an embodiment of the present disclosure. In an embodiment, the circuit shown in FIG. 4A is applicable to the source driver 122 and the display panel 110 in FIG. 1, but is not limited thereto.

As shown in FIG. 4A, the second channel group includes multiple channel data, and these channel data are transmitted to pixels on the display panel 110 through multiple channels (for example, channels numbered 1 to 13). The channels include switches SW1, SW2, . . . , and SWN (in FIG. 4A, for example, N=6), and the switches SW1, SW2, . . . , and SWN are respectively controlled by power saving control signals $DPS_1$, $DPS_2$, . . . , and $DPS_N$ (not shown), so as to determine whether data lines on the corresponding path are pre-charged (pre-charge) by closing the switches. In an embodiment, the pieces of channel data or channels corresponding to the pieces of channel data are divided into N groups, and a grouping rule may be, for example, finding the smallest period N repeatedly output by the source driver 122, that is, finding the smallest common multiple of a pixel period and a polarity inversion period. For example, if a pixel includes red green blue (RGB) subpixels, and a pixel array configuration manner thereof is column inversion (Column Inversion), N=1 cm(3,2)=6, and the pieces of channel data or the channels corresponding to the pieces of channel data are divided into six groups.

In the embodiment shown in FIG. 4A, when N=6, numbers 1, 7, and 13 are grouped into a first group, numbers 2 and 8 are grouped into a second group, numbers 3 and 9 are grouped into a third group, numbers 4 and 10 are grouped into a fourth group, numbers 5 and 11 are grouped into a fifth group, and numbers 6 and 12 are grouped into a sixth group. The grouping rule is one of grouping rules obtained according to different pixel structures, but is not limited thereto. Any other grouping rule in which N is an integer all falls within the protection scope of the present disclosure. In some embodiments, channels that are grouped into a same group receive channel data of a same polarity. For example, the channels 1, 7, and 13 of the first group receive channel data of the positive polarity.

As shown in FIG. 4A, the channels are electrically connected to the corresponding data lines (for example, DL1, DL2, . . . , and DL13) respectively, and are used to transmit corresponding channel data to the display panel 110 shown in FIG. 1. In addition, in the embodiment in which the circuit includes the switches SW1, SW2, SW3, SW4, SW5, and SW6 shown in FIG. 4A, one end of each of the switches SW1, SW2, SW3, SW4, SW5, and SW6 is electrically connected to a corresponding data line respectively, and the other end is electrically connected to an external capacitor respectively. In an embodiment, the external capacitor may be configured to store a dynamically regulated voltage. In operation, when a voltage on the data line (that is, a voltage corresponding to a current gray scale value of the data line) is greater than the voltage stored in the external capacitor, a corresponding voltage difference is stored into the external capacitor. When the voltage on the data line is less than the voltage stored in the external capacitor, the external capacitor discharges to provide a corresponding voltage difference. In another embodiment, the external capacitor may be set in such a manner that the external capacitor stores a fixed voltage.

Figure 4B:
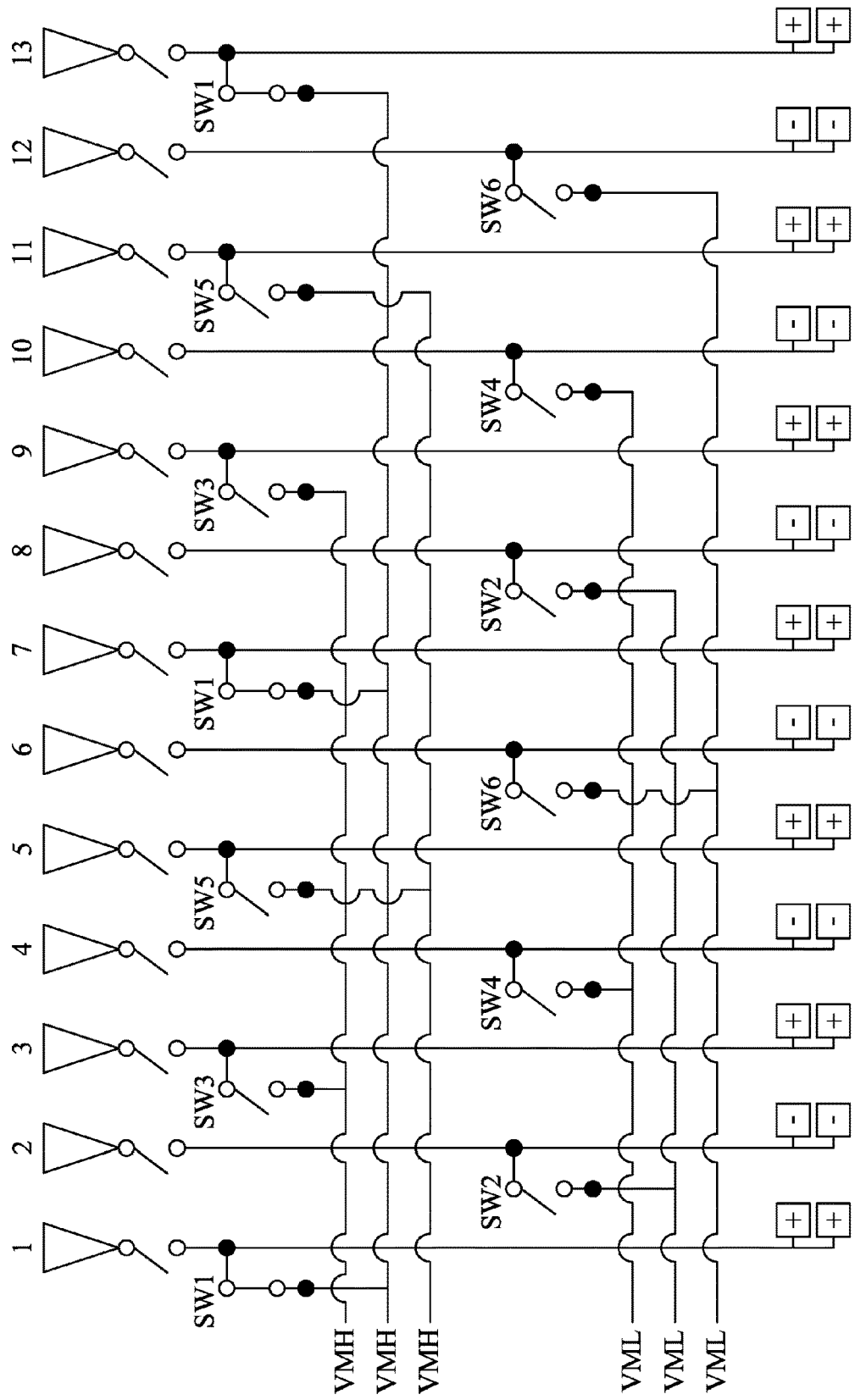
FIG. 4B is a schematic diagram of a partial circuit of the display apparatus shown in FIG. 1 according to another embodiment of the present disclosure.

In another embodiment, the other end of each of the switches SW1, SW2, SW3, SW4, SW5, and SW6 may be coupled to a corresponding reference potential, and is not electrically connected to an external capacitor. Referring to FIG. 4B, FIG. 4B is a schematic diagram of a partial circuit of the display apparatus 100 shown in FIG. 1 according to another embodiment of the present disclosure. In an embodiment, the circuit shown in FIG. 4B is applicable to the source driver 122 and the display panel 110 in FIG. 1, but is not limited thereto. In this embodiment, a positive polarity reference potential VMH and a negative polarity reference potential VML are respectively coupled to corresponding data lines through corresponding switches, where the reference potential VMH is greater than the reference potential VML.

In operation, as shown in FIG. 4B, if a pixel array configuration manner is column inversion (column inversion), in a first polarity state (for example, a drive voltage of a positive polarity is received in an odd column, and a drive voltage of a negative polarity is received in an even column, that is, +−+−+−), when the data lines corresponding to the first group (corresponding to the channels 1, 7, and 13) need to be pre-charged (pre-charge), the switches SW1 are closed, so that the reference potentials VMH are respectively coupled to the data lines DL1, DL7, and DL13 through the switches SW1, and in this way, the corresponding data lines are pre-charged. In addition, when the data lines corresponding to the first group (corresponding to the channels 1, 7, and 13), the second group (corresponding to the channels 2 and 8), the third group (corresponding to the channels 3 and 9), and the fifth group (corresponding to the channels 5 and 11) need to be pre-charged (pre-charge), the switches SW1, SW2, SW3, and SW5 are closed, so that the reference potentials VMH are respectively coupled to the data lines DL1, DL7, and DL13 through the switches SW1, the reference potentials VMH are respectively coupled to the data lines DL3 and DL9 through the switches SW3, the reference potentials VMH are respectively coupled to the data lines DL5 and DL11 through the switches SW5, and the reference potentials VML are respectively coupled to the data lines DL2 and DL8 through the switches SW2. Other operations are deduced by analogy.

Step S240 may include: obtaining through calculation three differences $\Delta L_1$, $\Delta L_2$, and $\Delta L_3$ for each group in the six groups in the second channel group, so as to calculate power consumptions in different power saving mechanisms. In terms of the differences $\Delta L_1$, $\Delta L_2$, and $\Delta L_3$, for clear description, the following provides descriptions by using the embodiment of FIG. 4A as an example, but is not limited thereto.

When pre-charging is not performed, the switches SW in FIG. 4A are not closed. In this case, the difference $\Delta L_1$ represents a difference between a target gray scale value and a current gray scale value in each group in an operation without a pre-charging operation. For example, in terms of the gray scale value corresponding to the first group (corresponding to the channels 1, 7, and 13), the difference $\Delta L_1$ corresponding to the first group is a result obtained by subtracting the current gray scale value of the channels 1, 7, and 13 in the first group from the target gray scale value of the channels 1, 7, and 13 in the first group.

In addition, when pre-charging is performed, the switches SW in FIG. 4A are selectively closed, so that corresponding channels are coupled to external capacitors through the switches SW. Therefore, voltages corresponding to the corresponding channels that are stored in the external capacitors have prestored gray scale values. In this case, the difference $\Delta L_2$ represents a difference between a target gray scale value and a prestored gray scale value in each group with a pre-charging operation. For example, in terms of the gray scale value corresponding to the first group (corresponding to the channels 1, 7, and 13), the difference $\Delta L_2$ corresponding to the first group is a result obtained by subtracting the prestored gray scale value of the channels 1, 7, and 13 that is obtained after pre-charging in the first group from the target gray scale value of the channels 1, 7, and 13 in the first group. On the other hand, when pre-charging is performed, the difference $\Delta L_3$ represents a difference between a prestored gray scale value and a current gray scale value in each group with a pre-charging operation.

Subsequently, it is determined, according to the difference $\Delta L_1$ and the difference $\Delta L_2$ in each group in the second channel group by using the first predetermined condition, whether a corresponding driving manner of the group is power-intensive. In an embodiment, when the pixel array configuration manner is a column inversion manner, and the first predetermined condition is in a normally black (Normally black) mode, it may be determined, based on the following Table 1 (in which a voltage mode is full positive voltage), Table 2 (in which a voltage mode is positive/negative voltage), or Table 3 (in which a voltage mode is half voltage), whether the corresponding driving manner of the group is power-intensive. The manner of determining, based on the first predetermined condition, whether a power-intensive case occurs is only an example, and is not intended to limit the present invention. For example, when the first predetermined condition is in a normally white (Normally white) mode, it may be determined, based on a corresponding lookup table, whether the corresponding driving manner is power-intensive. In addition, in another embodiment, a person of ordinary skill in the art may deduce by analogy a method for directly determining, without the first predetermined condition, whether the group is power-intensive.

TABLE 1

| | Voltage mode Full positive voltage Polarity status | |
|---|---|---|
| | First polarity state | Second polarity state |
| $\Delta L$ | + − | + − |
| Power consumption | Yes No | No Yes |

TABLE 2

| | Voltage mode Positive/negative voltage Polarity status | |
|---|---|---|
| | First polarity state | Second polarity state |
| $\Delta L$ | + − | + − |
| Power consumption | Yes No | Yes No |

TABLE 3

| | Voltage mode Half voltage Polarity status | |
|---|---|---|
| | First polarity state | Second polarity state |
| $\Delta L$ | + − | + − |
| Power consumption | Yes No | No No |

In some embodiments, the first polarity states in Table 1 to Table 3 may be positive polarities, and the second polarity states in Table 1 to Table 3 may be negative polarities.

FIG. 5A is a schematic diagram of a power consumption status when a voltage mode is a full positive voltage mode according to an embodiment of the present disclosure, where a solid line represents a power-intensive state, and a dashed line represents a non-power-intensive state. In the full positive voltage mode, because gray scale values corresponding to a grounded potential GND and a high potential AVDD are both 255, and a gray scale value corresponding to an intermediate potential is 0, if one of the groups receives a drive voltage of a positive polarity, the gray scale value is increased, causing a power-intensive case (corresponding to the solid line arrow that is upward in the upper part of FIG. 5A). In comparison, if the group receives a drive voltage of a negative polarity, on the contrary, an increase in the gray scale value causes no power-intensive case (corresponding to the dashed line arrow that is downward in the lower part of FIG. 5A).

First, referring to Table 1 and FIG. 5A together, Table 1 shows a case in which it is determined, in a full positive voltage mode according to a polarity state, $\Delta L$, and FIG. 5A together, whether a corresponding group is power-intensive. For example, in a normally black mode, a pixel array configuration manner is a column inversion manner, a voltage mode is full positive voltage, and in a first polarity state, a current gray scale value of the third group is 0, and a target gray scale value is 255. In this case, a procedure for determining whether a power-intensive case occurs is as follows: First, because of being in the first polarity state, it may be learned that comparison needs to be performed for the upper part (a positive polarity area) of FIG. 5A. Subsequently, it is learned from ΔL=255−0=255(+) that the upward arrow corresponding to the upper part of FIG. 5A is a solid line arrow, and it is determined that the third group is power-intensive. It may be deduced by analogy that whether a remaining corresponding group is power-intensive is determined according to Table 1.

Second, referring to Table 2 and FIG. 5B together, FIG. 5B is a schematic diagram of a power consumption status when a voltage mode is positive/negative voltage according to an embodiment of the present disclosure. A point of difference between FIG. 5B and FIG. 5A lies in that when the voltage mode is positive/negative voltage, the grounded potential GND is between a positive potential PAVDD and a negative potential NAVDD. Therefore, regardless of receiving a drive voltage of a positive polarity or a negative polarity by the group, to increase a small gray scale value to a large gray scale value, a potential needs to be pulled up from the grounded potential GND. Therefore, a power-intensive case occurs. On the contrary, to pull down a large gray scale value to a small gray scale value, no power-intensive case occurs.

Moreover, referring to Table 3 and FIG. 5C together, FIG. 5C is a schematic diagram of a power consumption status when a voltage mode is half voltage according to an embodiment of the present disclosure. A difference between FIG. 5C and FIG. 5A lies in that when the voltage mode is half voltage, switching between the intermediate potential HAVDD and the grounded potential GND is non-power-intensive (that is, the two dashed line arrows in the lower part of FIG. 5C), that is, when the corresponding group receives the drive voltage of the negative polarity, no power-intensive case occurs, and a case of receiving the drive voltage of the positive polarity is the same as both FIG. 5A and FIG. 5B.

The embodiment of the normally black mode is merely an example, and is not intended to limit the present invention. A person of ordinary skill in the art may deduce by analogy a power consumption status of the normally white mode.

Subsequently, it is determined, according to the difference $\Delta L_3$ of each group in the second channel group by using the second predetermined condition, whether the corresponding driving manner of the group needs an additional calculation in an algorithm. In this embodiment, in the additional calculation, the difference $\Delta L_3$ is multiplied by (−1), which represents whether a plus or minus of a gray scale difference is contrary to an actual power saving/power-intensive status. In this embodiment, the pixel array configuration manner is a column inversion manner, and the second predetermined condition is to determine, in the normally black mode and based on Table 4, whether the plus or minus of the difference $\Delta L_3$ (that is, a difference between a prestored gray scale value and a current gray scale value) is contrary to the actual power saving/power-intensive status (where in Table 4, if ×(−1) is "yes", it represents that the plus or minus is contrary to the actual power saving/power-intensive status, and if ×(−1) is "no", it represents that the plus or minus is the same as the actual power saving/power-intensive status).

TABLE 4

| | Voltage mode | | | | | |
|---|---|---|---|---|---|---|
| | Full positive voltage | | Positive/negative voltage | | Half voltage | |
| | Polarity status | | | | | |
| | First polarity state | Second polarity state | First polarity state | Second polarity state | First polarity state | Second polarity state |
| ×(−1) | Yes | No | Yes | Yes | Yes | x |

Referring to Table 4 and FIG. 6A together, FIG. 6A is a schematic diagram of a power consumption status when an external capacitor stores a potential when a voltage mode is a full positive voltage mode according to an embodiment of the present disclosure, where a solid line represents discharging the external capacitor, and a dashed line represents charging the external capacitor. In FIG. 6A, whether ×(−1) is required in different cases is determined according to a full positive voltage feature in FIG. 5A. For example, if the corresponding group is in the first polarity state, referring to the two arrows on the left (positive polarity area) in FIG. 6A, when a gray scale value corresponding to a voltage difference stored in an external capacitor is 100, and a current gray scale value of a data line corresponding to the external capacitor is 120, a potential difference, corresponding to the gray scale value being (100−120)×(−1)=20, is stored into the external capacitor, that is, a charge is stored into the external capacitor. A reason for needing to performing multiplying by (−1) is that in the full positive voltage mode, $\Delta L_3$ is "−", and in the positive polarity area, it represents a decrease in the voltage. Therefore, for the external capacitor, it is charging, and that multiplying by (−1) needs to be performed represents that the gray scale value corresponding to the charge stored in the external capacitor is increased by 20. In comparison, if in a case the same as the foregoing example, when the gray scale value corresponding to the voltage difference stored in the external capacitor is 100, and the current gray scale value of the data line corresponding to the external capacitor is 80, a potential difference, corresponding to the gray scale value being (100−80)×(−1)=−20, is discharged from the external capacitor, that is, the external capacitor charges the data line.

Referring to Table 4 and FIG. 6B together, FIG. 6B is a schematic diagram of a power consumption status when an external capacitor stores a potential when a voltage mode is a positive/negative voltage mode according to an embodiment of the present disclosure. In FIG. 6B, whether to discharge for the external capacitor or charge the external capacitor in difference cases is determined according to a positive/negative voltage feature in FIG. 5B. A difference between FIG. 6B and FIG. 6A lies in that when the corresponding group receives the drive voltage of the negative polarity, a case of FIG. 6B is contrary to that of FIG. 6A.

Referring to Table 4 and FIG. 6C together, FIG. 6C is a schematic diagram of a power consumption status when an external capacitor stores a potential when a voltage mode is a half voltage mode according to an embodiment of the present disclosure. In FIG. 6C, whether to discharge for the external capacitor or charge the external capacitor in difference cases is determined according to a half voltage feature in FIG. 5C. Compared with FIG. 6A and FIG. 6B, the biggest difference of FIG. 6C lies in that when the corresponding group receives the drive voltage of the negative polarity, impact of a relationship between the gray scale value corresponding to the external capacitor and the current gray scale value on the external capacitor is not considered. This is because a negative polarity area is non-power-intensive in the half voltage mode.

Figure 7:
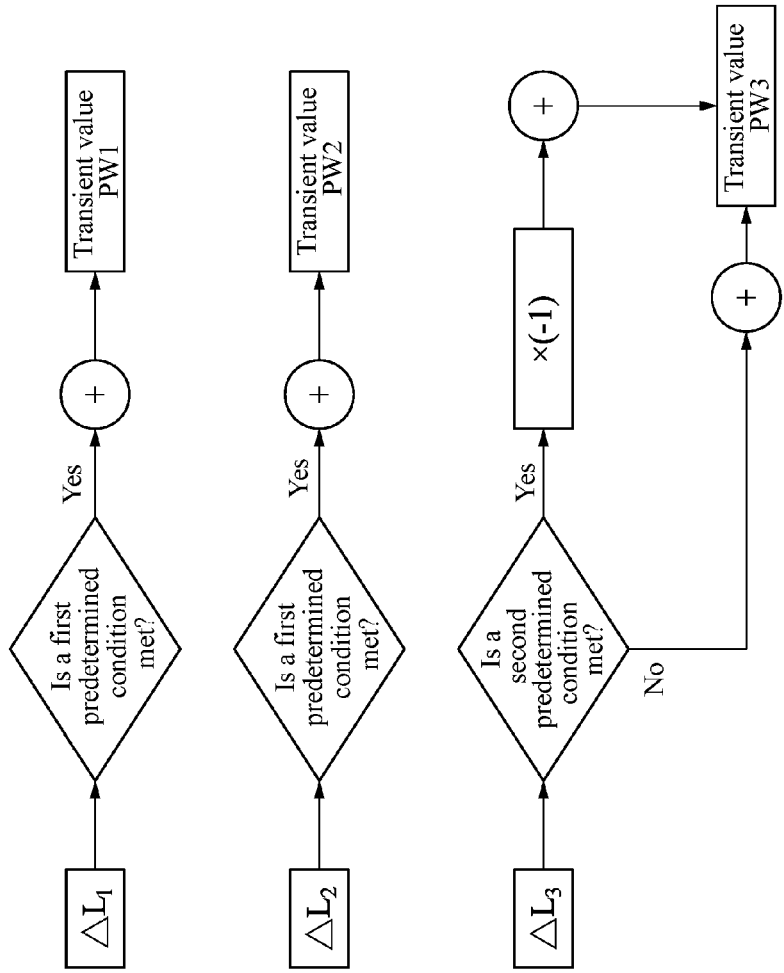
FIG. 7 is a schematic diagram of a part of a method for operating the display apparatus shown in FIG. 1 according to an embodiment of the present disclosure.

Subsequently, referring to FIG. 7, FIG. 7 is a schematic diagram of a partial method 700 for operating the display apparatus 100 shown in FIG. 1 according to an embodiment of the present disclosure. Using the $n^{th}$ group in the second channel group as an example, each of differences $\Delta L_{1m}$ that meets the first predetermined condition (that is, it is determined, by using Table 1, Table 2, or Table 3, that a power-intensive case occurs) in the $n^{th}$ group is added to obtain a transient value PW1, which represents a total power consumption of the $n^{th}$ group in a case without pre-charging. Second, each of differences $\Delta L_{2m}$ that meets the first predetermined condition (that is, it is determined, by using Table 1, Table 2, or Table 3, that a power-intensive case occurs) in the $n^{th}$ group is added to obtain a transient value PW2, which represents a total power consumption of the $n^{th}$ group in a case with pre-charging. Moreover, each of differences $\Delta L_{3m}$ that meets the second predetermined condition (that is, it is determined, by using Table 4, that ×(−1) is "yes") in the $n^{th}$ group is adjusted (that is, multiplied by (−1)) and added, and each of the differences $\Delta L_{3m}$ that does not meet the second predetermined condition (that is, it is determined, by using Table 4, that ×(−1) is "no") is added to obtain a transient value PW3, which represents an accumulated charge quantity of external capacitors of the $n^{th}$ group. Some elements in the differences $\Delta L_{3m}$ need to be multiplied by (−1) while some elements do not need to be multiplied by (−1) and then added. This is because in a specific polarity area in a specific mode, pluses or minuses of some elements in the differences $\Delta L_{3m}$ are contrary to the actual power saving/power-intensive status.

Subsequently, step S250 is performed, to generate a power saving control signal DPS, to control an operation of the source driver 122 to achieve the smallest power consumption. In an embodiment, step S250 and step S230 may be performed at the same time. In an embodiment, for the $n^{th}$ group, an absolute value of the transient value PW2 is subtracted from an absolute value of the transient value PW1 obtained in step S240, to obtain a first estimated value, that is, a power consumption when pre-charging is performed is subtracted from a power consumption subtract when pre-charging is not performed. A reason for calculating the absolute value is that when the group receives the drive voltage of the negative polarity, its power consumption is a negative value, and the absolute value needs to be calculated to compare a substantial power consumption when pre-charging is not performed with a substantial power consumption when pre-charging is performed. When the first estimated value is greater than the second critical value, the $n^{th}$ group needs to be pre-charged. Generally, a person of ordinary skill in the art may set the second critical value according to a requirement of a user.

In another embodiment, for the $n^{th}$ group, in addition to subtracting the absolute value of the transient value PW2 from the absolute value of the transient value PW1 obtained in step S240, the transient value PW3 may further be considered. Although the transient value PW3 (which represents an accumulated charge quantity in the external capacitor) does not cause a substantial power consumption, a substantial meaning thereof is to predict a possible future power consumption. Compared with the actual power consumption, the predicted possible future power consumption will not cause a same level of impact in terms of the power saving mechanism. Therefore, in the determining formula for determining whether pre-charging is performed, the transient value PW3 needs to be multiplied by a previous weight, where the weight may be set differently according to requirements of different users. When a sum of the second estimated value and the product of the transient value PW3 is greater than the second critical value, the $n^{th}$ group needs to be pre-charged.

Subsequently, after it is determined whether the $n^{th}$ group needs to be pre-charged, a power saving control signal $DPS_n$ is generated, to control the switches SWn that are coupled to the $n^{th}$ group, so that the $n^{th}$ group achieves the smallest power consumption. Each group in the second channel group is deduced by analogy, so that the entire second channel group has the smallest power consumption.

In step S260, it is determined whether a polarity inversion occurs. The polarity inversion usually occurs in a case of page turning, two line dot inversion (two line dot inversion), three line dot inversion (three line dot inversion), or the like. If it is determined that polarity inversion occurs is "yes", it represents that the foregoing calculation result is not suitable. Therefore, step S270 needs to be performed, to transmit a preset bias voltage control signal BC and a preset power saving control signal DPS to the source driver 122. Otherwise, step S280 is performed, to transmit the bias voltage control signal BC obtained in step S230 and the power saving control signal DPS obtained in step S250 to the source driver 122.

In step S270, the preset power saving control signal DPS controls a corresponding path to operate when the path is not coupled to the external capacitor (that is, when pre-charging is not performed).

In step S280, the bias voltage control signal BC obtained in step S230 and the power saving control signal DPS obtained in step S250 are transmitted to the source driver 122, so that the values of corresponding currents in the driving circuit of the first channel group and the switches SW of the second channel group can be respectively controlled.

Referring to FIG. 8, FIG. 8 is a flowchart of a method 800 for dynamically adjusting an operation in the driving method 200 in FIG. 2 according to another embodiment of the present disclosure. In this embodiment, steps S240 and S250 in FIG. 2 are replaced with steps S810, S820, and S830, to form another implementation.

In step S810, each group in N groups in the second channel group are divided into multiple combinations GC according to electrical connections between different groups, where the electrical connections between the groups may be construed as charge sharing between the groups. In the present disclosure, GCs (where s represents one set, including multiple permutations and combinations of the N groups) is used to represent a combination of charge sharing (charge sharing). For example, GC+0 represents that there is no charge sharing between groups that are used to receive the drive voltage of the positive polarity in the N groups and there is no charge sharing between channels included in the groups, either. GC−0 represents that there is no charge sharing between groups that are used to receive the drive voltage of the negative polarity in the N groups and there is no charge sharing between channels included in the groups. GC135 represents that the first group, the third group, and the fifth group are electrically connected to each other and perform charge sharing with each other.

In an embodiment, the second channel group is divided into six groups (N=6), the pixel array configuration manner is a column inversion manner, and the polarity state is the first polarity state. In other words, pixels in the first, third, fifth columns receive the drive voltage of the positive polarity, and pixels in the second, fourth, and sixth columns receive the drive voltage of the negative polarity. Because the groups that receive the drive voltage of the positive polarity share charges with the groups that receive the drive voltage of the positive polarity, and the groups that receive the drive voltage of the negative polarity share charges with the groups that receive the drive voltage of the negative polarity, the six groups may be divided into, for example, 16 combinations sharing charges with each other.

In step S820, an average gray scale value of each combination GC is calculated. For example, average gray scale values of different combinations are respectively calculated by using a gray scale value of the first group and a gray scale value of another group in combinations GC11, GC13, GC15, and GC135 that include the first group. Subsequently, the same method is used to deduce by analogy for other groups in the second channel group to respectively calculate average gray scale values of all the combinations.

In an embodiment in which the second channel group includes six groups, a gray scale value of current channel data of 14 combinations except GC+0 and GC−0 obtained in step S810 is calculated. Subsequently, current gray scale values are subtracted from target gray scale values of all data lines in GC+0 and GC−0, so as to obtain a difference $\Delta L_{1+}$ and a difference $\Delta L_{1-}$. An average value of a current gray scale value of each combination in the other 14 combinations are subtracted from target gray scale values of all data lines in GC+0 and GC−0, so as to obtain 14 differences $\Delta L_{2s}$ (where s belongs to one of the 14 combinations). Subsequently, it is respectively determined, according to the current voltage mode, whether all elements in the difference $\Delta L_{1+}$, the difference $\Delta L_{1-}$, and the respective differences $\Delta L_{2s}$ of the 14 group combinations meet the first predetermined condition (Table 1, Table 2, or Table 3), where the difference $\Delta L_{2s}$ may be classified into a difference $\Delta L_{2s+}$ and a difference $\Delta L_{2s-}$ according to whether a group in s receives a drive voltage of the positive polarity or a voltage of the negative polarity. Multiple elements in the difference $\Delta L_{1+}$ that meet the first predetermined condition are added to obtain a transient value $PW1_+$ (a power consumption when none of groups that receive the drive voltage of the positive polarity performs charge sharing). Multiple elements in the difference $\Delta L_{1-}$ that meet the first predetermined condition are added to obtain a transient value $PW1_-$ (a power consumption when none of groups that receive the drive voltage of the negative polarity perform charge sharing). Multiple elements in each difference $\Delta L_{2s+}$ that meet the first predetermined condition are added to obtain multiple transient values $PW2_{s+}$ (a power consumption when a combination s+ that receives the drive voltage of the positive polarity performs charge sharing). Multiple elements in each difference $\Delta L_{2s-}$ that meet the first predetermined condition are added to obtain multiple transient values $PW2_{s-}$ (a power consumption when a combination s− that receives the drive voltage of the negative polarity performs charge sharing).

In step S830, a combination that has the smallest power consumption is selected. In the foregoing embodiment, the multiple transient values $PW2_{s+}$ obtained in step S820 are compared according to the group that receives the drive voltage of the positive polarity, and the smallest transient value is selected, which is the transient value $PW2_+$. When a result obtained by subtracting an absolute value of the transient value $PW2_+$ from an absolute value of the transient value $PW1_+$ is greater than the second critical value, a combination corresponding to the transient value $PW2_+$ is selected for charge sharing. Otherwise, the group that receives the drive voltage of the positive polarity does not perform charge sharing (that is, GC+0). Subsequently, a corresponding power saving control signal DPS is generated, to achieve the smallest power consumption. Generally, a person of ordinary skill in the art may set the second critical value according to a requirement of a user.

Using the foregoing embodiment as an example, the group that receives the drive voltage of the positive polarity may be classified into eight combinations: GC+0, GC11, GC13, GC15, GC135, GC33, GC35, and GC55. First, multiple transient values PW2 corresponding to multiple combinations except GC+0 are compared. If the smallest transient value is $PW2_{35}$, the transient value $PW2_+$ is equal to the transient value $PW2_{35}$. Subsequently, when a result obtained by subtracting the absolute value of the transient value $PW1_+$ from the absolute value of the transient value $PW2_+$ is greater than the second critical value, the third group is electrically connected to the fifth group to perform charge sharing. When the result obtained by subtracting the absolute value of the transient value $PW1_+$ from the absolute value of the transient value $PW2_+$ is less than the second critical value, the first group, the third group, and the fifth group are not connected to each other and channels of each group are not connected to each other, that is, they perform no charge sharing.

On the other hand, the multiple transient values $PW2_{s-}$ obtained in step S820 are compared according to the group that receives the drive voltage of the negative polarity, and the smallest transient value is selected, which is the transient value $PW2_-$. When a result obtained by subtracting an absolute value of the transient value $PW2_-$ from an absolute value of the transient value $PW1_-$ is greater than the second critical value, a combination corresponding to the transient value $PW2_-$ is selected for charge sharing. Otherwise, the group that receives the drive voltage of the negative polarity does not perform charge sharing (that is, GC−0). Subsequently, a corresponding power saving control signal DPS is generated, to achieve the smallest power consumption.

Using the foregoing embodiment as an example, the group that receives the drive voltage of the negative polarity may be classified into eight combinations: GC−0, GC22, GC24, GC26, GC246, GC44, GC46, and GC66. First, multiple transient values PW2 corresponding to the multiple combinations except GC−0 are compared. If the smallest transient value is $PW2_{66}$, the transient value $PW2_-$ is equal to the transient value $PW2_{66}$. Subsequently, when a result obtained by subtracting the absolute value of the transient value $PW1_-$ from the absolute value of the transient value $PW2_-$ is greater than the second critical value, channels in the sixth group are electrically connected to perform charge sharing. When the result obtained by subtracting the absolute value of the transient value $PW1_-$ from the absolute value of the transient value $PW2_-$ is less than the second critical value, the second group, the fourth group, and the sixth group are not connected to each other and channels of each group are not connected to each other, that is, they perform no charge sharing.

FIG. 9 is a schematic block diagram of a circuit of the control unit 126 in FIG. 1 according to an embodiment of the present disclosure. The control unit 126 includes a memory circuit 910, a subtractor 920, a memory circuit 930, an adder 940, and a comparator 950.

The memory circuit 910 includes multiple temporary buffers, configured to store multiple pieces of channel data. In an embodiment, the memory circuit 910 includes a temporary buffer 911, a temporary buffer 912, a temporary buffer 913, a temporary buffer 914, and a temporary buffer 915. The temporary buffer 911 is configured to store a current gray scale value in the first channel group. The temporary buffer 912 is configured to store a target gray scale value in the first channel group. The temporary buffer 913 is configured to store a target gray scale value in the second channel group. The temporary buffer 914 is configured to store a current gray scale value in the second channel group. The temporary buffer 915 is configured to store a reference value SGL (that is, a gray scale value corresponding to a voltage difference in an external capacitor) associated with a power saving operation.

The subtractor 920 is coupled to the memory circuit 910, and is configured to subtract a gray scale value L11 stored in the temporary buffer 912 from a gray scale value L12 stored in the temporary buffer 911, to obtain a gray scale value difference L11-L12. In addition, the subtractor 920 subtracts the gray scale value stored in the temporary buffer 914 from the gray scale value stored in the temporary buffer 913 to obtain a difference $\Delta L_1$, subtracts the reference value SGL associated with the power saving operation from the gray scale value stored in the temporary buffer 914 to obtain a difference $\Delta L_2$, and subtracts the gray scale value stored in the temporary buffer 914 from the reference value SGL associated with the power saving operation to obtain a difference.

The memory circuit 930 is coupled to the subtractor 920, and is configured to: store a lookup table (including Table 1, Table 2, Table 3, Table 4, or a combination thereof), determine, according to the lookup table, whether the difference $\Delta L_1$ and the difference $\Delta L_2$ meet a first predetermined condition, and determine whether the difference $\Delta L_3$ meets a second predetermined condition. When a difference $\Delta L_1$ corresponding to each group meets the first predetermined condition, the memory circuit 930 outputs a difference $\Delta L_{1'}$ that meets the first predetermined condition to the adder 940. When a difference $\Delta L_2$ corresponding to each group meets the first predetermined condition, the memory circuit 930 outputs a difference $\Delta L_{2'}$ that meets the first predetermined condition to the adder 940. Whether a difference $\Delta L_3$ corresponding to each group meets the second predetermined condition is determined. When the difference $\Delta L_3$ corresponding to each group meets the second predetermined condition, the memory circuit 930 outputs a difference $\Delta L_{31'}$ that meets the first predetermined condition to the adder 940. When the difference $\Delta L_3$ corresponding to each group does not meet the second predetermined condition, the memory circuit 930 outputs a difference $\Delta L_{32'}$ that meets the first predetermined condition to the adder 940.

The adder 940 is coupled to the memory circuit 930. The adder 940 is configured to: add the difference $\Delta L_{1'}$ that meets the first predetermined condition to obtain the transient value PW1, add the difference $\Delta L_{2'}$ that meets the first predetermined condition to obtain the transient value PW2, and add the difference $\Delta L_{31'}$ that meets the second predetermined condition and the difference $\Delta L_{32'}$ that does not meet the second predetermined condition and multiply the result by (−1) to obtain the transient value PW3.

The comparator 950 is configured to: compare the gray scale value differences (L11-L12) obtained by the subtractor 920, to determine the largest gray scale value difference in the gray scale value differences (L11-L12), and compare the largest gray scale value difference with multiple first critical values, to determine a bias voltage control signal BC. The comparator 950 is further configured to determine, according to the transient value PW1, the transient value PW2, the transient value PW3, and the second critical value, whether one group in the second channel group transmits the power saving control signal DPS to the group for pre-charging.

In conclusion, in some embodiments of the pixel driving method according to the present disclosure, the channel data may be divided into multiple groups based on a driving manner thereof, and a coupling manner of the multiple groups is determined to achieve the smallest power consumption. Because the channel data is calculated by groups in the pixel driving method, an amount of calculation thereof can be effectively reduced, and the substantially smallest power consumption can be achieved according to actual calculation.

Although the present disclosure has been disclosed by using implementations, the implementations are not used to limit the present invention. A person skilled in the art can make various modifications and improvements without departing from the spirit and scope of the present invention. Therefore, the protection scope of the present invention should be subject to the scope defined by the appended claims.

What is claimed is:
1. A driving method, comprising:
allocating a plurality of gray scale values to a plurality of first channel groups and a plurality of second channel groups;
determining, based on the gray scale values, a largest gray scale value difference of two adjacent gray scale values of each of the first channel groups, to determine a plurality of drive currents, wherein the drive currents are used to drive the first channel groups, and the drive currents are determined by:
obtaining, for a first group in the first channel groups, a plurality of first data values and a plurality of second data values in the gray scale values, wherein each of the first data values corresponds to a first gray scale value of the two adjacent gray scale values of the first group, and each of the second data values corresponds to a second gray scale value of the two adjacent gray scale values of the first group;
correspondingly subtracting the second data values from the first data values to determine a plurality of gray scale value differences;
determining the largest gray scale value difference according to the gray scale value differences; and
outputting a bias voltage control signal based on a comparison result of the largest gray scale value difference and at least one first predetermined threshold value, wherein the bias voltage control signal is used to determine at least one corresponding current in the drive currents that is used to drive the first group, and the larger the largest gray scale value difference is, the larger the at least one corresponding current is;
determining a first transient value and a second transient value that correspond to each of the second channel groups by:
obtaining, for the second channel groups, a plurality of third data values and a plurality of fourth data values, wherein each of the third data values and each of the fourth data values correspond to a second group in the second channel groups;
correspondingly subtracting the fourth data values from the third data values to obtain a plurality of first differences;
determining whether at least one of the first differences meets a first predetermined condition;

when at least one of the first differences meets the first predetermined condition, obtaining, by an adder, a sum of the at least one of the first differences that meets the first predetermined condition as the first transient value corresponding to the second group;

subtracting a reference value associated with a power saving operation from the third data values to obtain a plurality of second differences;

determining whether at least one of the second differences meets the first predetermined condition; and when at least one of the second differences meets the first predetermined condition, obtaining, by the adder, a sum of the at least one of the second differences that meets the first predetermined condition as the second transient value corresponding to the second group; and determining, based on the first transient value and the second transient value corresponding to each of the second channel groups, whether at least one of the second channel groups performs the power saving operation.

2. The driving method according to claim 1, wherein the determining whether at least one of the second channel groups performs the power saving operation comprises:

obtaining an estimated value as a difference between an absolute value of the first transient value and an absolute value of the second transient value; and when the estimated value is greater than a second predetermined threshold value and polarities of the second channel groups do not change, outputting a power saving control signal, so that the second group performs the power saving operation.

3. The driving method according to claim 1, wherein the driving method further comprises:

subtracting the fourth data values from the reference value, to determine a plurality of third differences associated with the second group;

determining whether at least one of the third differences meets a second predetermined condition; and when at least one of the third differences meets the second predetermined condition, adjusting the at least one of the third differences that meets a second predetermined condition, to generate at least one fourth difference, and obtaining, by the adder, a sum of the at least one fourth difference and at least one of the third differences that does not meet the second predetermined condition as a third transient value corresponding to the second group.

4. The driving method according to claim 3, the determining whether at least one of the second channel groups performs the power saving operation comprises:

obtaining a difference between an absolute value of the first transient value and an absolute value of the second transient value, and a product of the third transient value and a weighting coefficient;

obtaining an estimated value as a sum of the difference and the product; and when the estimated value is greater than a second predetermined threshold value and polarities of the second channel groups do not change, outputting a power saving control signal, so that the second group performs the power saving operation.

5. A driving method, comprising:

allocating a plurality of gray scale values to a plurality of first channel groups and a plurality of second channel groups, wherein the second channel groups have M channel groups, M is a positive integer;

determining, based on the gray scale values, a largest gray scale value difference of two adjacent gray scale values of each of the first channel groups, to determine a plurality of drive currents, wherein the drive currents are used to drive the first channel groups, and the drive currents are determined by:

obtaining, for a first group in the first channel groups, a plurality of first data values and a plurality of second data values in the gray scale values, wherein each of the first data values corresponds to a first gray scale value of the two adjacent gray scale values of the first group in the first channel groups, and each of the second data values corresponds to a second gray scale value of the two adjacent gray scale values of the first group in the first channel groups;

correspondingly subtracting the second data values from the first data values to determine a plurality of gray scale value differences;

determining the largest gray scale value difference according to the gray scale value differences; and outputting a bias voltage control signal based on a comparison result of the largest gray scale value difference and at least one first predetermined threshold value, wherein the bias voltage control signal is used to determine at least one corresponding current in the drive currents that is used to drive the first group in the first channel groups, and the larger the largest gray scale value difference is, the larger the at least one corresponding current is;

determining a first transient value and a second transient value that correspond to each of the second channel groups by:

obtaining, for the second channel groups, a plurality of third data values and a plurality of fourth data values, wherein each of the third data values and each of the fourth data values correspond to a first group in the second channel groups;

correspondingly subtracting the fourth data values from the third data values to obtain a plurality of first differences;

determining whether at least one of the first differences meets a predetermined condition;

when at least one of the first differences meets the predetermined condition, obtaining, by an adder, a sum of the at least one of the first differences that meets the predetermined condition as the first transient value corresponding to the first group in the second channel groups;

obtaining a plurality of data average values, wherein each of the data average values is an average value of the fourth data value of the first group and the fourth data value of at least one corresponding group in the first group to an $M^{th}$ group in the second channel group;

respectively subtracting the data average values from the third data values, to obtain a plurality of second differences corresponding to the first group to the $M^{th}$ group in the second channel groups;

determining whether at least one of the second differences meets the predetermined condition;

corresponding to the first group to the $M^{th}$ group, respectively obtaining, by the adder, a sum of the at least one of the second differences that meets the predetermined condition as a plurality of magnitudes; and determining the second transient value as the smallest one of the magnitudes; and determining, based on the first transient value and the second transient value corresponding to each of the second channel groups, whether at least one of the second channel groups performs a power saving operation.

6. The driving method according to claim 5, wherein the determining whether at least one of the second channel groups performs the power saving operation comprises:
   obtaining an estimated value as a difference between an absolute value of the first transient value and an absolute value of the second transient value; and
   when the estimated value is greater than a second predetermined threshold value and polarities of the second channel groups do not change, outputting a power saving control signal, so that a plurality of corresponding groups associated with the second transient value in the second channel groups perform the power saving operation.

7. A display apparatus, comprising:
   a control unit, configured to allocate a plurality of gray scale values to a plurality of first channel groups and a plurality of second channel groups, wherein the control unit is further configured to:
      determine, based on the gray scale values, a largest gray scale value difference of two adjacent gray scale values of each of the first channel groups, to determine a plurality of drive currents, wherein the drive currents are used to drive the first channel groups;
      determine, based on a first piece of data and a second piece of data that correspond to each of the second channel groups in the gray scale values, a first transient value and a second transient value that correspond to each of the second channel groups; and
      generate a power saving operation signal based on the first transient value and the second transient value corresponding to each of the second channel groups, to determine whether at least one of the second channel groups performs a power saving operation; and
   a driver, configured to output the drive currents and to drive, based on the power saving operation signal, the at least one of the second channel groups to perform the power saving operation,
   wherein the control unit comprises:
      a first memory circuit, configured to store the gray scale values;
      a subtractor, coupled to the first memory circuit, and configured to determine, based on the gray scale values, a plurality of gray scale value differences of the two adjacent gray scale values corresponding to each of the first channel groups, and to determine a plurality of differences based on the first piece of data and the second piece of data that correspond to each of the second channel groups in the gray scale values;
      a second memory circuit, coupled to the subtractor, and configured to store a lookup table, wherein the lookup table is used to determine whether the differences meet at least one predetermined condition;
      an adder, coupled to the second memory circuit, and configured to add at least one of the differences that meets the at least one predetermined condition, to generate the first transient value and the second transient value that correspond to each of the second channel groups; and
      a comparator, configured to: compare the gray scale value differences, to determine the largest gray scale value difference in the gray scale value differences, and compare the largest gray scale value difference with at least one first predetermined threshold value to determine the drive currents, and to determine, based on the first transient value, the second transient value, and at least one predetermined second threshold value, whether one of the second channel groups performs the power saving operation, wherein the drive currents are used to drive the first channel groups.

8. The display apparatus according to claim 7, wherein the subtractor is configured to correspondingly subtracting a plurality of second data values in the gray scale values from a plurality of first data values in the gray scale values, to determine the gray scale value differences, wherein
   the first data values correspond to a first gray scale value of the two adjacent gray scale values of a first group in the first channel groups, and the second data value correspond to a second gray scale value of the two adjacent gray scale values of the first group.

9. The display apparatus according to claim 8, wherein the comparator is configured to output a bias voltage control signal based on a comparison result of the largest gray scale value difference and the at least one first predetermined threshold value, wherein
   the bias voltage control signal is used to determine at least one corresponding current in the drive currents that is used to drive the first group, and the larger the largest gray scale value difference is, the larger the at least one corresponding current is.

10. The display apparatus according to claim 7, wherein the subtractor is configured to subtract a second data value in the first piece of data from a first data value in the second piece of data, to determine a plurality of first differences in the differences, and is configured to subtract a reference value associated with the power saving operation from the first data value, to determine a plurality of second differences in the differences, wherein
   the first data value and the second data value correspond to a first group in the second channel groups; and
   the adder is further configured to add at least one of the first differences that meets a first predetermined condition of the at least one predetermined condition, to generate the first transient value corresponding to the first group, and is configured to add at least one of the second differences that meets the first predetermined condition, to generate the second transient value corresponding to the first group.

11. The display apparatus according to claim 10, wherein the comparator is further configured to compare an estimated value with the at least one second predetermined threshold value, and when the estimated value is greater than the at least one predetermined second threshold value and polarities of the second channel groups do not change, the comparator is further configured to output the power saving control signal, so that the first group performs the power saving operation, wherein
   the subtractor is further configured to generate the estimated value as a difference between an absolute value of the first transient value and an absolute value of the second transient value.

12. The display apparatus according to claim 10, wherein when the second channel groups are further used to share a charge sharing mechanism to perform the power saving operation, the subtractor is further configured to subtract the second data value from the reference value, to determine a plurality of third differences associated with the first group in the differences, and the adder is further configured to add an absolute value of at least one of the third differences that meets a second predetermined condition in the at least one predetermined condition, to generate a third transient value corresponding to the first group.

13. The display apparatus according to claim 12, wherein the comparator is further configured to compare an estimated value with the at least one second predetermined threshold value, and when the estimated value is greater than the at least one second predetermined threshold value and polarities of the second channel groups do not change, the comparator is further configured to output the power saving control signal, so that the first group performs the power saving operation, wherein the adder is further configured to generate the estimated value as a sum of a difference between an absolute value of the first transient value and an absolute value of the second transient value and a product, and the product is a product of the third transient value and a weighting coefficient.

14. The display apparatus according to claim 7, wherein the second channel groups have M channel groups, M is a positive integer, and the subtractor is configured to subtract a second data value in the first piece of data from a first data value in the second piece of data, to determine a plurality of first differences in the differences, and is configured to respectively subtract a plurality of data average values from the first data value, to determine a plurality of second differences corresponding to the first group to the $M^{th}$ group in the second channel groups in the differences, wherein the first data value and the second data value correspond to a first group in the second channel groups; and the data average values are each an average value of the second data value of the first group and the second data value of at least one corresponding group in the first group to the $M^{th}$ group.

15. The display apparatus according to claim 14, wherein the adder is configured to add at least one of the first differences that meets the at least one predetermined condition, to generate the first transient value corresponding to the first group, and is configured to: corresponding to the first group to the $M^{th}$ group, respectively add at least one of the second differences that meets the at least one predetermined condition, to generate a plurality of magnitudes, wherein the smallest one of the magnitudes is the second transient value.

16. The display apparatus according to claim 15, wherein the comparator is further configured to compare an estimated value with a third predetermined threshold value, and when the estimated value is greater than the third predetermined threshold value and polarities of the second channel groups do not change, the comparator is configured to output the power saving control signal, so that a plurality of corresponding groups associated with the second transient value in the second channel groups perform the power saving operation, wherein the subtractor is further configured to generate the estimated value as a difference between an absolute value of the second transient value and an absolute value of the first transient value.

17. The display apparatus according to claim 7, further comprising:

a plurality of channels, wherein at least two adjacent channels in the channels are classified as one of the first channel groups, and the channels are classified as the second channel groups according to a period of an output signal associated with the driver, and a same group in the second channel groups is used to receive gray scale values having a same polarity in the gray scale values.

\* \* \* \* \*